United States Patent
Wang

(10) Patent No.: US 10,300,977 B1
(45) Date of Patent: May 28, 2019

(54) WHEELED VEHICLE WITH BALL HOOP APPARATUS

(71) Applicant: Tai-Chih Wang, Taichung (TW)

(72) Inventor: Tai-Chih Wang, Taichung (TW)

( * ) Notice: Subject to any disclaimer, the term of this patent is extended or adjusted under 35 U.S.C. 154(b) by 0 days.

(21) Appl. No.: 15/827,128

(22) Filed: Nov. 30, 2017

(51) Int. Cl.
  *B62K 9/02* (2006.01)
  *A63B 63/08* (2006.01)

(52) U.S. Cl.
  CPC .............. *B62K 9/02* (2013.01); *A63B 63/08* (2013.01)

(58) Field of Classification Search
  CPC .................................. B62K 9/02; A63B 63/08
  See application file for complete search history.

(56) References Cited

U.S. PATENT DOCUMENTS

| | | | | |
|---|---|---|---|---|
| 7,288,034 B2* | 10/2007 | Woodard | ............... | A63B 63/08 473/479 |
| 7,611,146 B2* | 11/2009 | Arden | .................. | A63B 67/083 273/317 |
| 8,844,960 B2* | 9/2014 | Young | .................... | B62K 15/00 280/278 |

* cited by examiner

*Primary Examiner* — Eugene L Kim
*Assistant Examiner* — Jeffrey S Vanderveen
(74) *Attorney, Agent, or Firm* — Ming Chow; Sinorica, LLC

(57) ABSTRACT

A wheeled vehicle with a ball hoop apparatus has a main body, multiple wheels, a pushing pole, and a hoop. The main body has an assembling mount. The multiple wheels are rotatably assembled to the main body. The pushing pole is detachably assembled to the main body. The pushing pole is able to be assembled to the assembling mount and has a top end. The hoop is assembled to the main body and is able to be assembled to the top end of the pushing pole. The pushing pole may be erectly assembled to the assembling mount. The hoop may be assembled to the top end of the pushing pole. The wheeled vehicle with a ball hoop apparatus provides a shooting ball function.

11 Claims, 11 Drawing Sheets

WHEELED VEHICLE WITH BALL HOOP APPARATUS

BACKGROUND OF THE INVENTION

1. Field of the Invention

The present invention relates to a wheeled vehicle for children and more particularly to a wheeled vehicle with a ball hoop apparatus for ball shooting at any time.

2. Description of Related Art

A conventional tricycle for children has a main body, three wheels, and a pushing pole. The main body has a front end, a rear end, a handle, and a fork. The handle is disposed at the front end of the main body and is able to spin for controlling the marching direction of the main body of the conventional tricycle. The fork is assembled to the handle and is able to spin with the handle. The three wheels are a front wheel and two rear wheels. The front wheel is rotatably assembled to the fork. The two rear wheels are assembled at the rear end of the main body. The pushing pole is assembled to the main body for an adult to push the tricycle to guide a child riding the tricycle.

However, the conventional tricycle is designed for one and only one purpose, i.e. for a child to ride thereon. When the child arrives at a destination, the conventional tricycle is unable to provide any further entertainment. So applicability of the conventional tricycle for children is limited.

To overcome the shortcomings of the conventional tricycle for children, the present invention provides a wheeled vehicle with a ball hoop apparatus to mitigate or obviate the aforementioned problems.

SUMMARY OF THE INVENTION

The main objective of the present invention is to provide a wheeled vehicle for children that is able to facilitate ball shooting.

The wheeled vehicle with a ball hoop apparatus comprises a main body, multiple wheels, a pushing pole, and a hoop. The main body has an assembling mount. The multiple wheels are rotatably assembled to the main body. The pushing pole is detachably assembled to the main body. The pushing pole is able to be assembled to the assembling mount and has a top end. The hoop is assembled to the main body and is able to be assembled to the top end of the pushing pole. The pushing pole may be erectly assembled to the assembling mount. The hoop may be assembled to the top end of the pushing pole. The wheeled vehicle with a ball hoop apparatus facilitates ball shooting for fun.

Other objects, advantages, and novel features of the invention will become more apparent from the following detailed description when taken in conjunction with the accompanying drawings.

DETAILED DESCRIPTION OF PREFERRED EMBODIMENT

Figure 1:
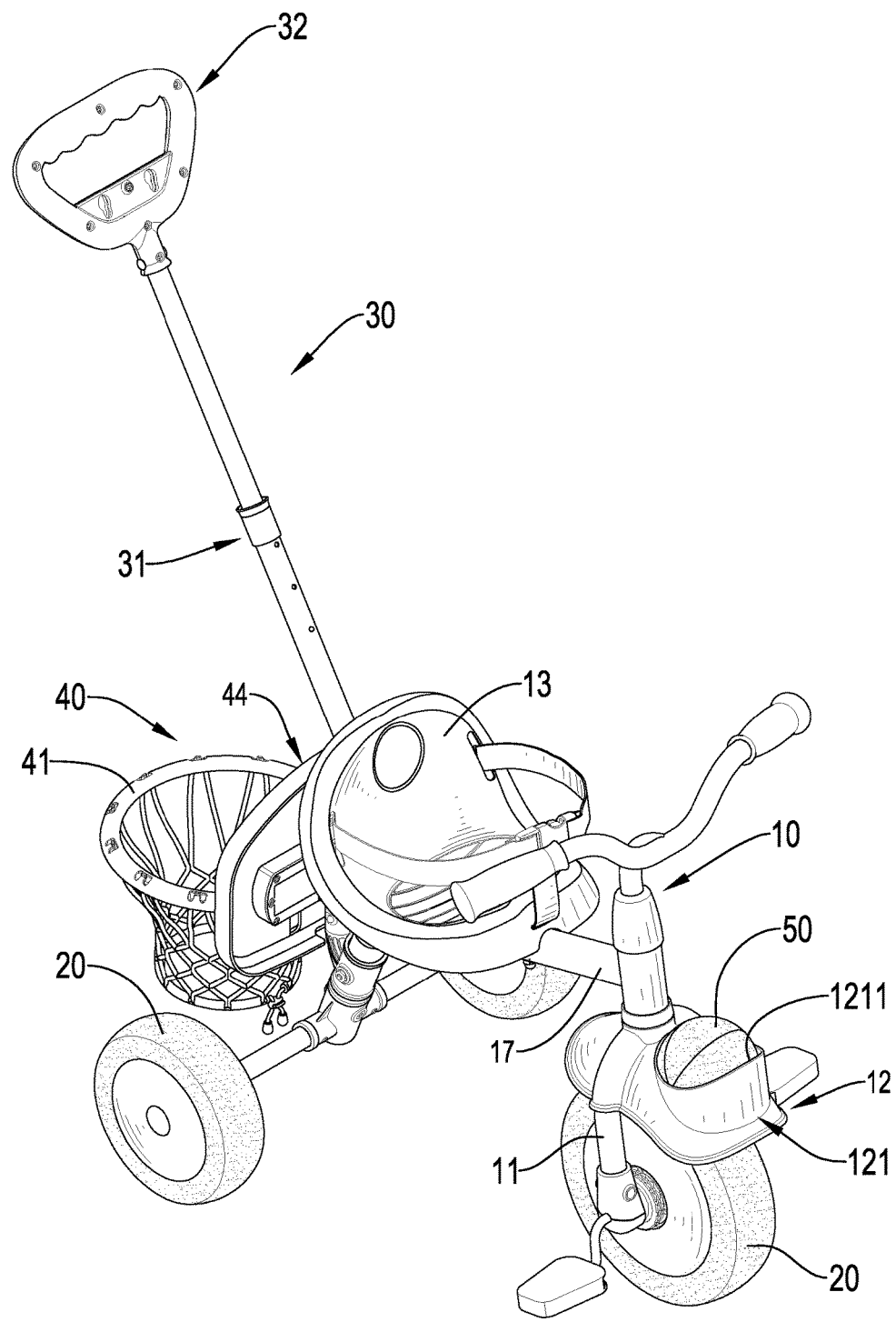
FIG. 1 is a perspective view of a first embodiment of a wheeled vehicle with a ball hoop apparatus in accordance with the present invention.
Figure 2:
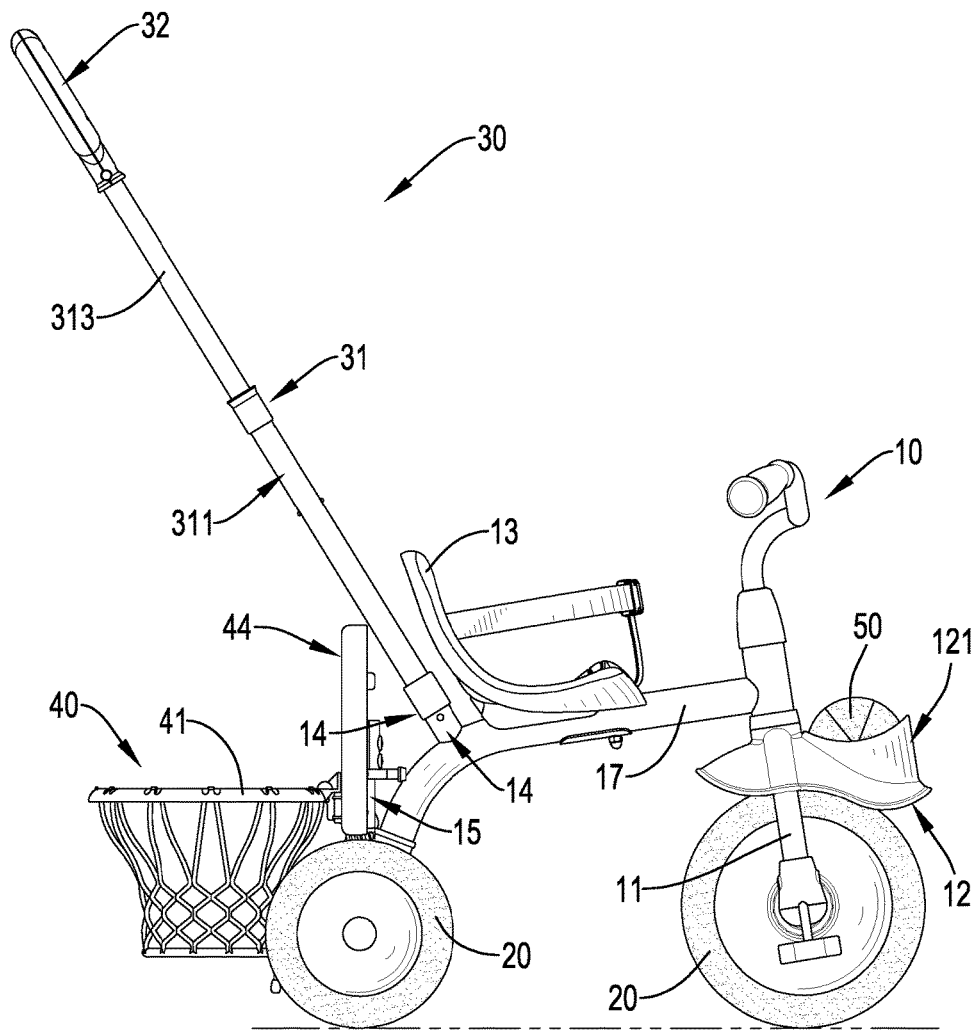
FIG. 2 is a side view of the wheeled vehicle in FIG. 1.

The present invention provides a wheeled vehicle with a ball hoop apparatus. With reference to FIGS. 1 and 2, a first embodiment of the wheeled vehicle in accordance with the present invention is a tricycle for children. The tricycle has a main body 10, multiple wheels 20, a pushing pole 30, a hoop 40, and a ball 50. The multiple wheels 20, the pushing pole 30, and the hoop 40 are assembled to the main body 10. The ball 50 is carried by the main body 10.

Figure 3:
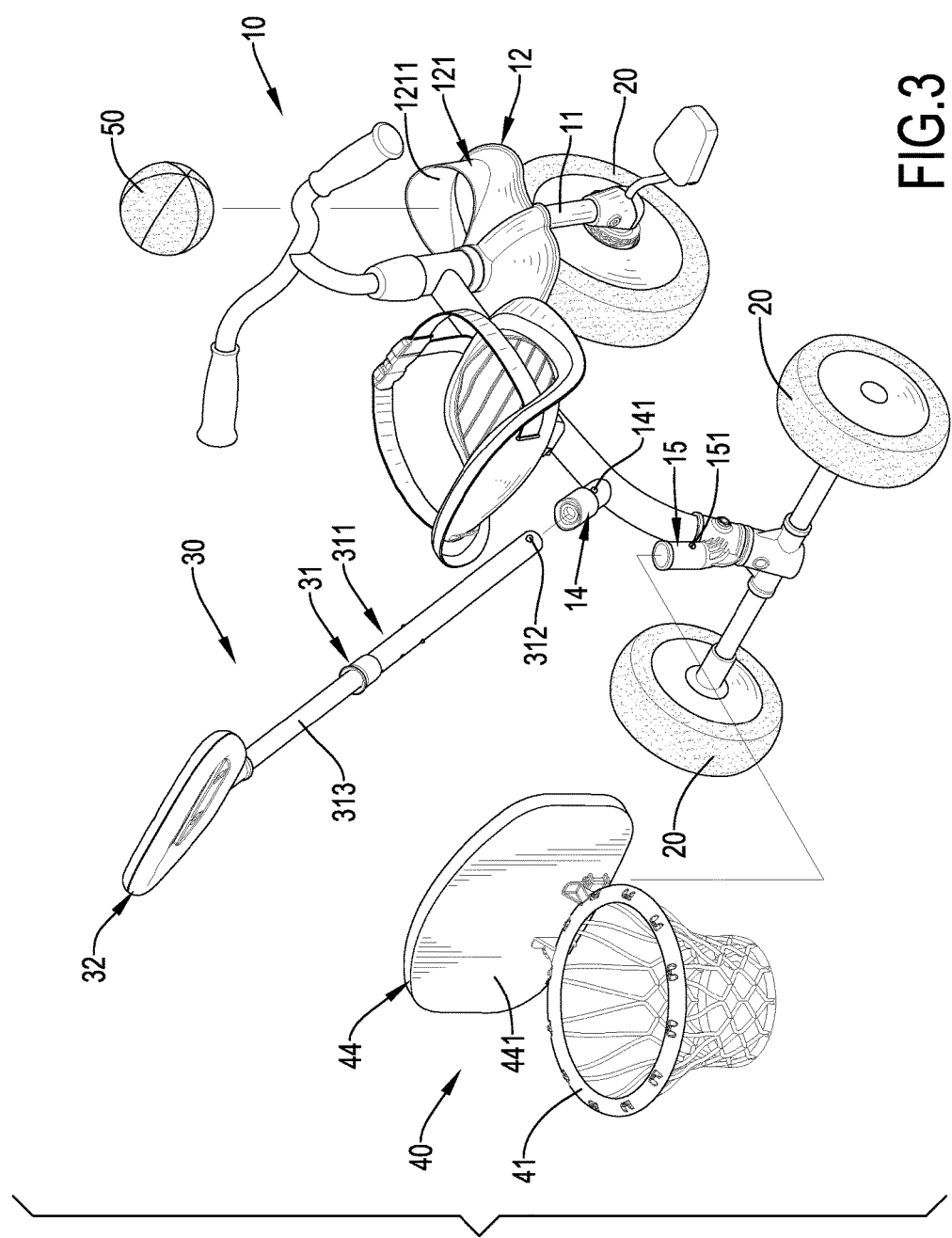
FIG. 3 is a partial exploded perspective view of the wheeled vehicle in FIG. 1.

With reference to FIGS. 1, 2, and 3, the main body 10 has a front end, a rear end, a fork 11, a fender 12, a seat 13, a connecting mount 14, and an assembling mount 15. The front end and the rear end of the main body 10 are opposite each other. The fork 11 is arranged at the front end of the main body 10 and has two lower ends. The fender 12 is assembled to the fork 11 above the two lower ends of the fork 11. The fender 12 has a ball mount 121 having a through recess 1211. The seat 13 is disposed at a middle portion of the main body 10. The connecting mount 14 is disposed behind the seat 13. The connecting mount 14 is tubular and has a connecting hole 141 radially communicating with the inside of the connecting mount 14. The assembling mount 15 is disposed at the rear end of the main body 10. The assembling mount 15 is tubular and has an assembling hole 151 radially communicating with the inside of the assembling mount 15.

With reference to FIGS. 1, 2, and 3, the multiple wheels 20 are rotatably assembled to the main body 10 and are a front wheel and two rear wheels. The front wheel is disposed at the front end of the main body 10 and rotatably assembled to the two lower ends of the fork 11 of the main body 10. The front wheel extends into the through recess 1211 of the ball mount 121. The two rear wheels are disposed at the rear end of the main body 10.

Figure 4:
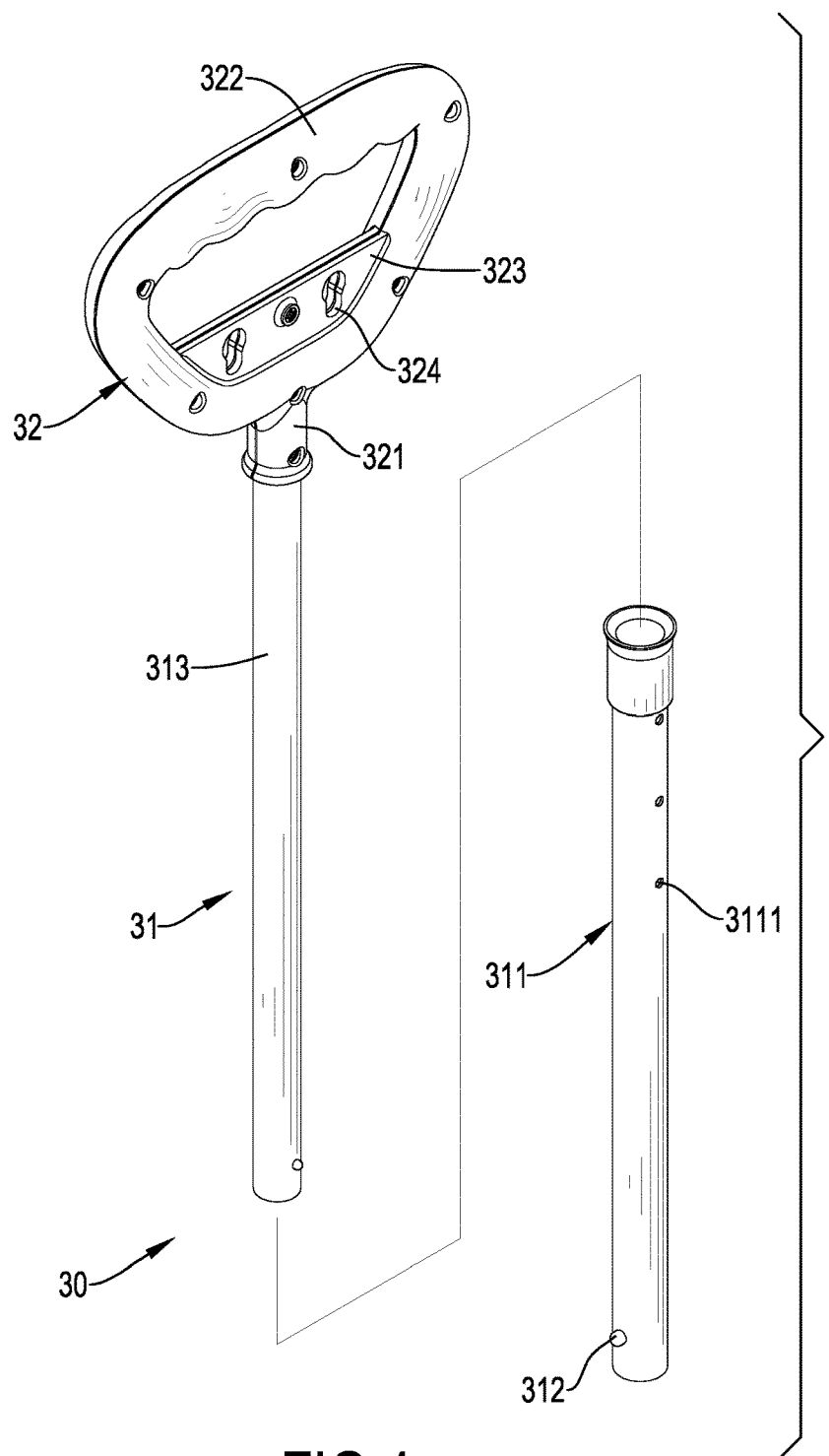
FIG. 4 is a partial exploded perspective view of a pushing pole of the wheeled vehicle in FIG. 3.

With reference to FIGS. 1, 2, and 3, the pushing pole 30 is detachably assembled to the connecting mount 14 of the main body 10. The pushing pole 30 is utilized for an adult to push the tricycle to guide a child riding the tricycle. With reference to FIG. 4, the pushing pole 30 has a top end distal from the connecting mount 14, a pole body 31, and a handle 32. The pole body 31 is retractable and has a first tube 311, a connecting plunger 312, a second tube 313, and an adjusting plunger 314. The first tube 311 has two opposite ends and multiple adjusting holes 3111. One of the two opposite ends of the first tube 311 is assembled to the connecting mount 14. The multiple adjusting holes 3111 are distal from the connecting mount 14 at spaced intervals and aligned with one another.

The connecting plunger 312 is a spring loaded plunger. The connecting plunger 312 is assembled to the first tube 311, disposed at one of the two opposite ends of the first tube 311 adjacent to the connecting mount 14, and is distal from the multiple adjusting holes 3111. The connecting plunger 312 is inserted in the connecting mount 14 with the first tube 311. The connecting plunger 312 protrudes out from the connecting hole 141 of the connecting mount 14 and engages the connecting hole 141.

The second tube 313 has two opposite ends. One of the two opposite ends of the second tube 313 is inserted in the first tube 311. The second tube 313 is able to retract relative to the first tube 311, adjusting a total length of the pole body 31.

The adjusting plunger 314 is a spring loaded plunger. The adjusting plunger 314 is assembled to the second tube 313, disposed at one of the two opposite ends of the second tube 313 adjacent to the first tube 311, and inserted in the first tube 311. The adjusting plunger 314 protrudes out from one of the multiple adjusting holes 3111 of the first tube 311 and engages one corresponding adjusting hole 3111 of the multiple adjusting holes 3111. The first tube 311 and the second tube 313 are connected together by the adjusting plunger 314.

The handle 32 is assembled to the second tube 313 of the pole body 31 and is disposed at the top end of the pushing pole 30. The handle 32 has a tubular portion 321, a grabbing portion 322, a connecting plate 323, and two keyholes 324. The tubular portion 321 has two opposite ends. One of the two opposite ends of the tubular portion 321 is mounted on the second tube 313 and distal from the connecting mount 14. The grabbing portion 322 is formed on the other opposite end of the tubular portion 321 and has a loop outline. The connecting plate 323 is formed within the grabbing portion 322. The two keyholes 324 are formed through the connecting plate 323.

With reference to FIGS. 2 to 4, and 11, the hoop 40 is detachably assembled to the assembling mount 15 of the main body 10. The hoop 40 has a backboard 44, a hoop body 41, an inserting section 42, and a fixing plunger 43. The backboard 44 has a board 441 and two fasteners 442. The board 441 has two opposite sides. The two fasteners 442 are assembled to one of the two opposite sides of the board 441. The hoop body 41 is assembled to the other one of the two opposite sides of the board 441. The board 441 is disposed between the hoop body 41 and the two fasteners 442. The inserting section 42 is connected to the backboard 44 and is inserted in the assembling mount 15 of the main body 10. The inserting section 42 and the two fasteners 442 are disposed at a same side of the two opposite sides of the board 441. The fixing plunger 43 is also a spring loaded plunger and is assembled to the inserting section 42. The fixing plunger 43 is inserted in the assembling mount 15 with the inserting section 42. The fixing plunger 43 protrudes out from the assembling hole 151 of the assembling mount 15 and engages the assembling hole 151 for fixing the hoop 40 and the assembling mount 15.

Figure 7:
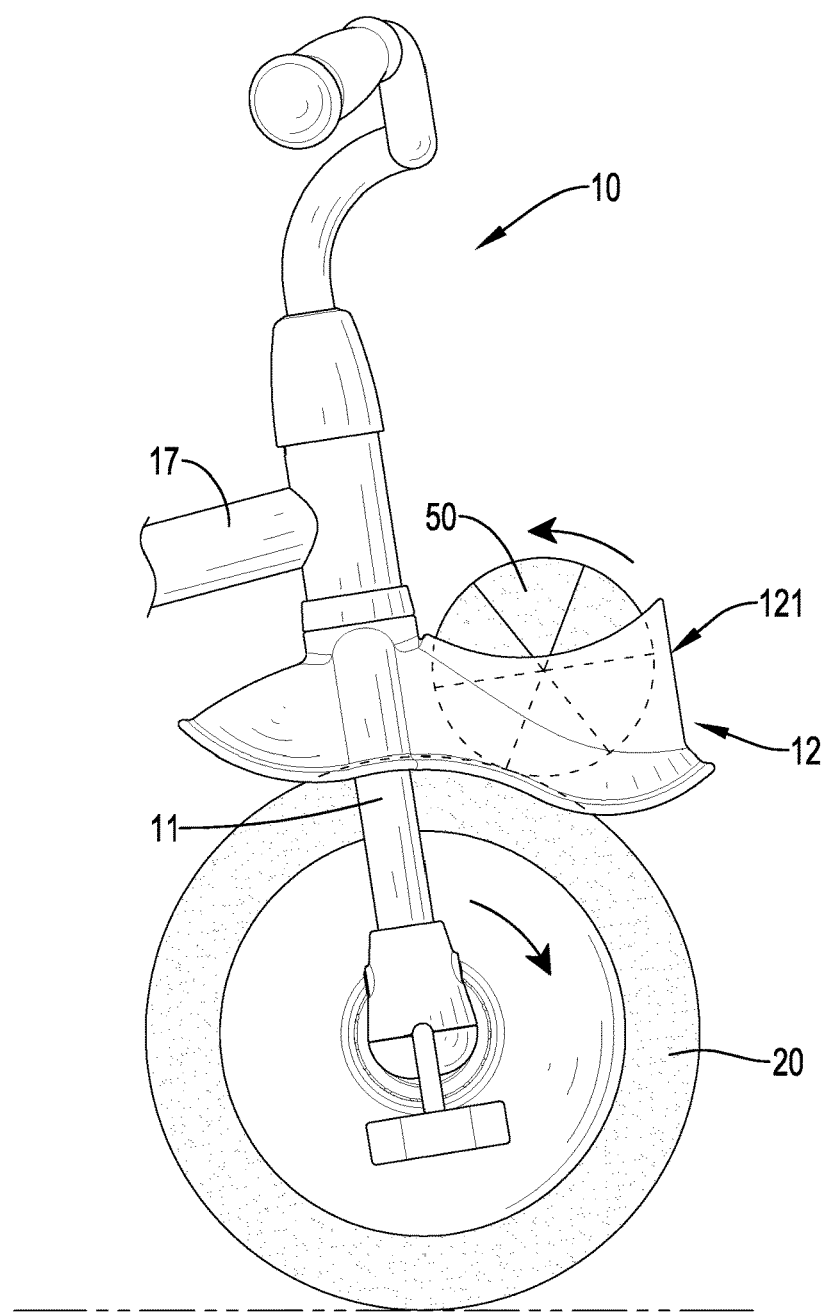
FIG. 7 is a partial operational side view of the wheeled vehicle in FIG. 1, showing a ball driven by a wheel.

With reference to FIGS. 1, 3, and 4, the ball 50 is received in the ball mount 121 of the fender 12 of the main body 10. With reference to FIGS. 3 and 7, the ball 50 passes through the through recess 1211 and contacts the front wheel. The ball 50 is driven by the front wheel and rotates in the ball mount 121.

Figure 5:
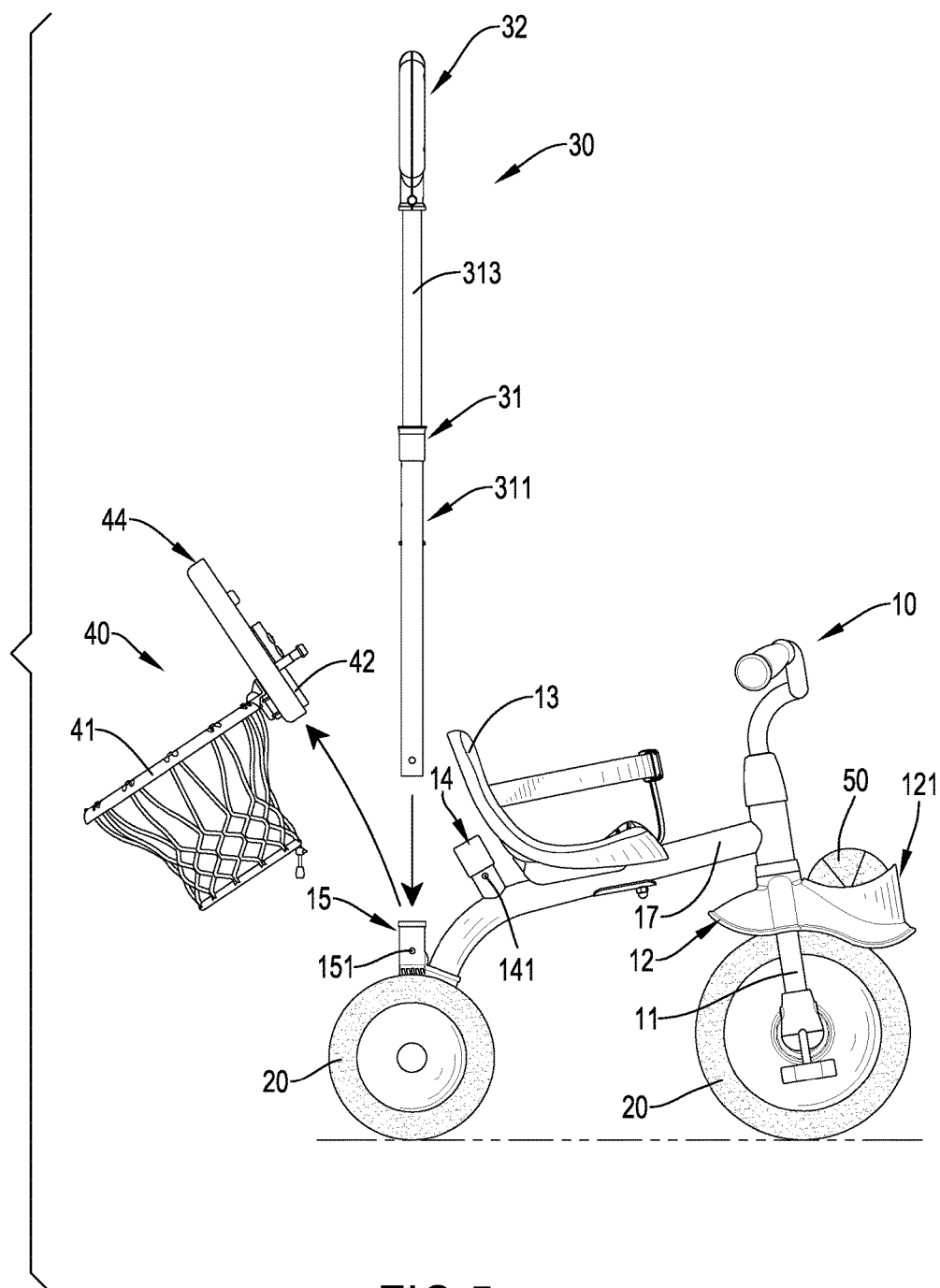
FIG. 5 is an operational side view of the wheeled vehicle in FIG. 1, showing the pushing pole assembled to an assembling mount.
Figure 6:
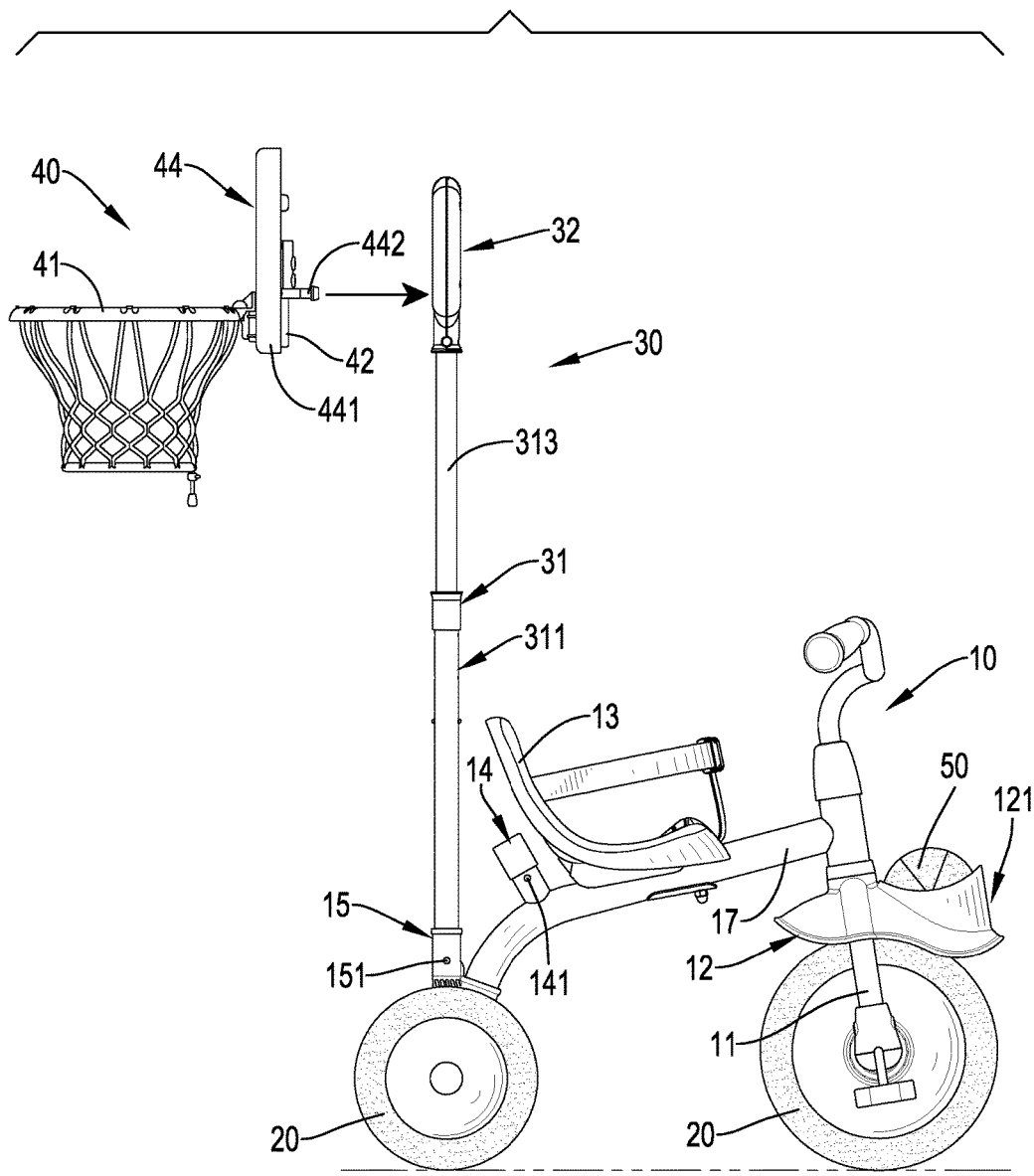
FIG. 6 is another operational side view of the wheeled vehicle in FIG. 1, showing a hoop assembled to the pushing pole.
Figure 8:
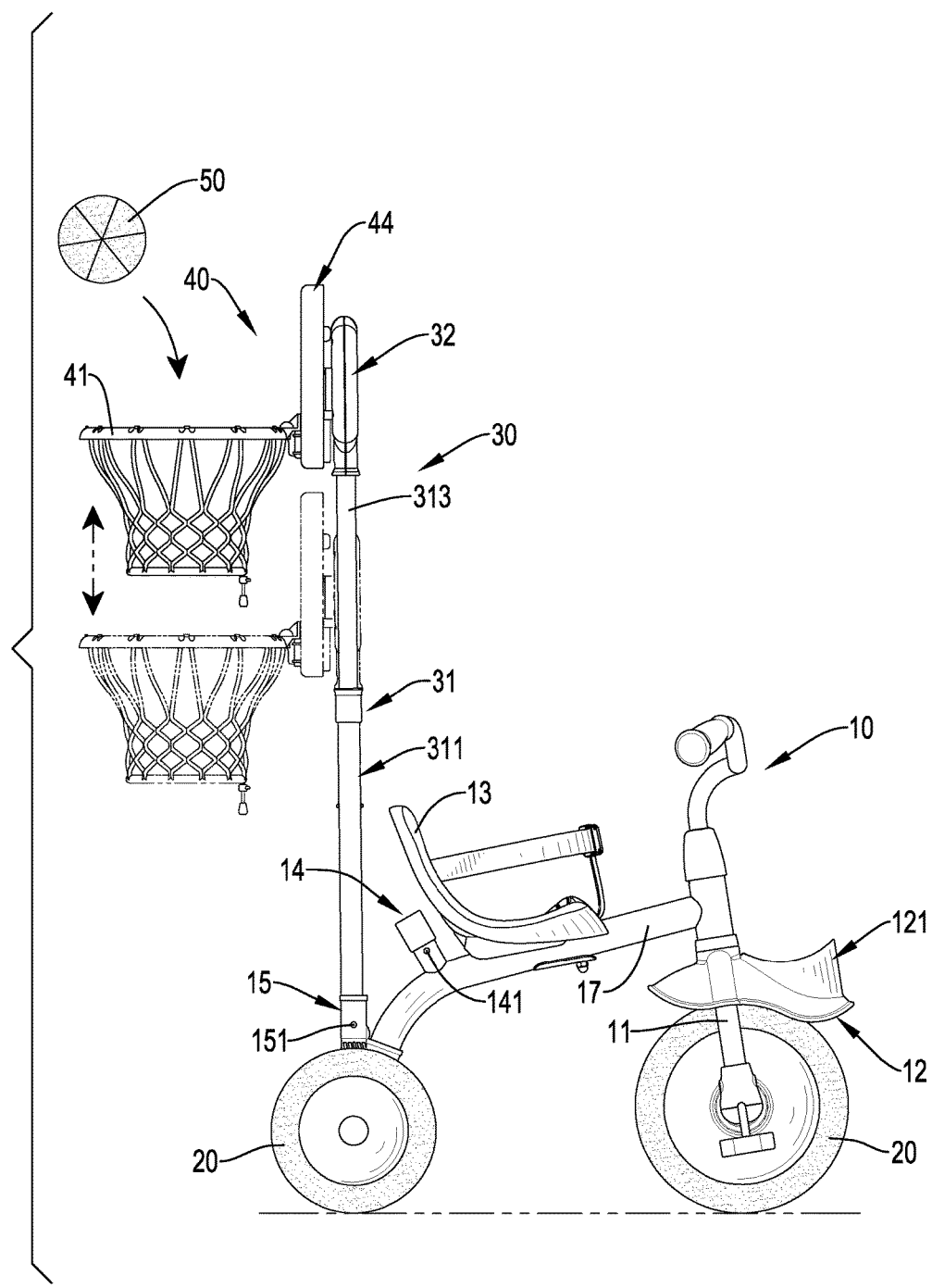
FIG. 8 is a partial operational side view of the wheeled vehicle in FIG. 1, showing the pushing pole adjusted up and down.

With reference to FIGS. 5 and 6, the pushing pole 30 and the hoop 40 may be respectively removed from the connecting mount 14 and the assembling mount 15 of the main body 10. And then the pushing pole 30 is erectly assembled to the assembling mount 15 of the main body 10. The connecting plunger 312 assembled to the first tube 311 of the pushing pole 30 engages the assembling hole 151 of the assembling mount 15 to make the pushing pole 30 steadily assembled to the assembling mount 15. The hoop 40 is assembled to the handle 32. The two fasteners 442 are respectively inserted into the two keyholes 324 of the handle 32. Children can take the ball 50 from the ball mount 12 and shoot the ball 50 in the hoop 40 assembled to the top end of the pushing pole 30 for fun. With reference to FIGS. 4 and 8, the adjusting plunger 314 of the pole body 31 of the pushing pole 30 may arbitrarily engages one of the multiple adjusting holes 3111 of the first tube 311 to adjust a height of the hoop 40 relative to the main body 10 for accommodating heights of the children.

Figure 9:
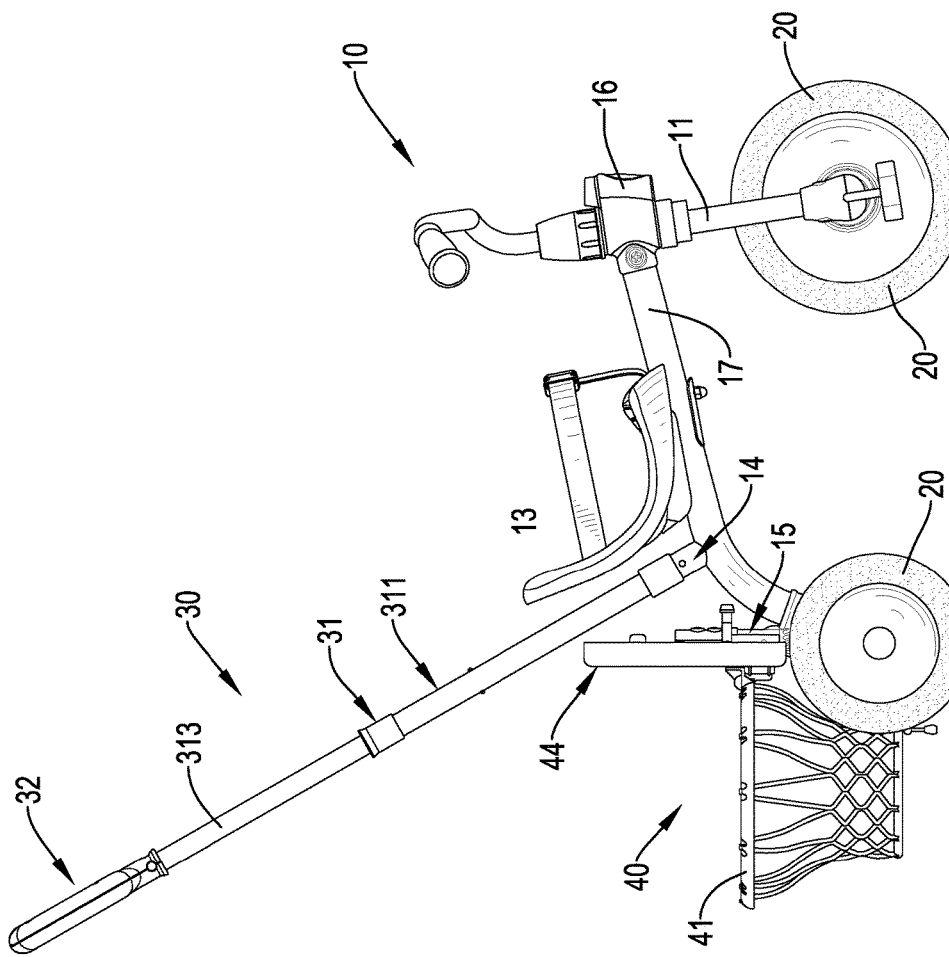
FIG. 9 is a side view of a second embodiment of a wheeled vehicle with a ball hoop apparatus in accordance with the present invention.
Figure 10:
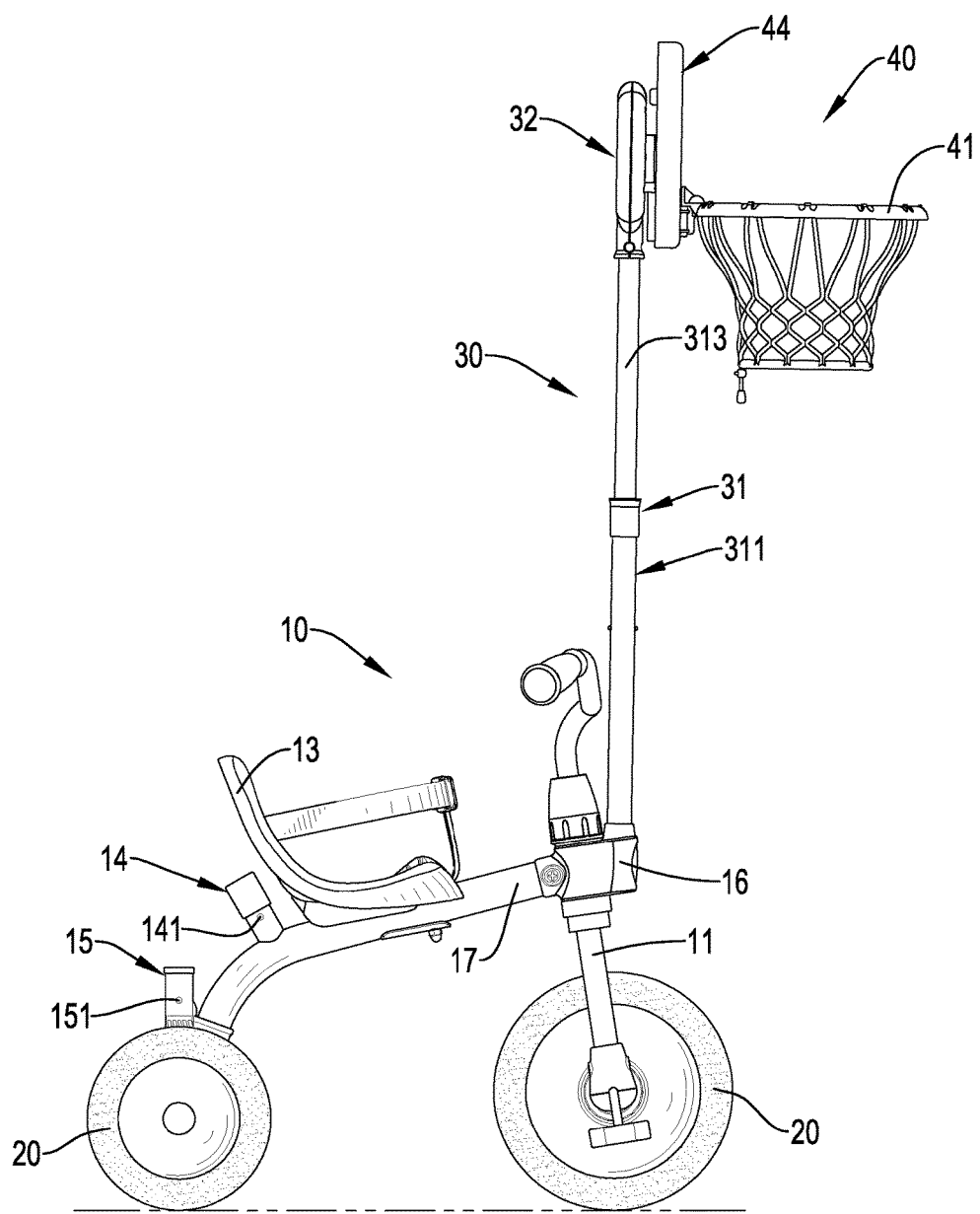
FIG. 10 is an operational side view of the wheeled vehicle in FIG. 9, showing the hoop assembled to the pushing pole.
Figure 11:
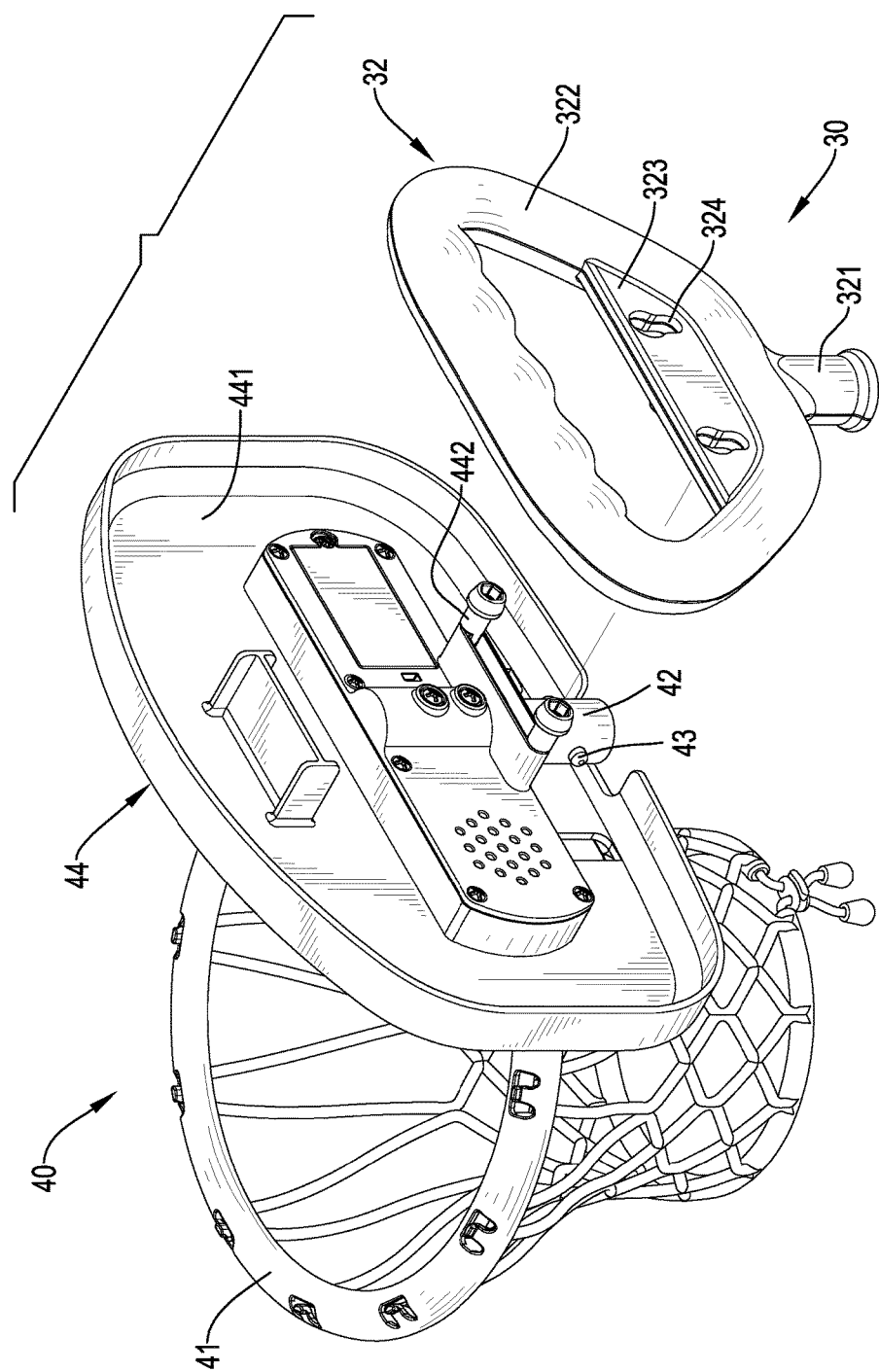
FIG. 11 is a partial exploded perspective view of a handle and a hoop in FIG. 1.

With reference to FIG. 9, a second embodiment of the wheeled vehicle in accordance with the present invention is substantially the same as the first embodiment except for the following features. In the second embodiment, the fender 12 of the main body 10 is omitted, and the body 10 further has a second assembling mount 16. The second assembling mount 16 is connected to a top tube 17 of the main body 10 and is disposed at the front end of the main body 10. The hoop 40 is assembled to the assembling mount 15 of the main body 10. With reference to FIG. 10, the pushing pole 30 and the hoop 40 may be respectively removed from the connecting mount 14 and the assembling mount 15 behind the seat 13. Then, the pushing pole 30 is assembled to the second assembling mount 16. The hoop 40 is assembled to the top end of the pushing pole 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wheeled vehicle with a ball hoop apparatus comprising:
   a main body having
   an assembling mount;
   a front end;
   a fork arranged at the front end of the main body; and
   a fender assembled to the fork and having
   a ball mount having a through recess;
   the through recess defined through the ball mount for receiving a ball;
   multiple wheels rotatably assembled to the fork of the main body;
   the ball passing through the through recess, contacting one of the multiple wheels that is rotatably assembled to the fork, driven by said one of the wheels, and being rotatable;
   a pushing pole detachably assembled to the main body, having a top end, and being assembleable to the assembling mount; and
   a hoop detachably assembled to the main body and being assembleable to the top end of the pushing pole.

2. The wheeled vehicle as claimed in claim 1, wherein the pushing pole has a pole body being retractable.

3. The wheeled vehicle as claimed in claim 2, wherein
the pushing pole has a handle assembled to the pole body and disposed at the top end of the pushing pole; and
the hoop is able to be assembled to the handle.

4. The wheeled vehicle as claimed in claim 3, wherein
the assembling mount is tubular and has an assembling hole communicating with an inside of the assembling mount;
the pole body has
a first tube having two opposite ends, one of the two opposite ends of the first tube being insertable into the assembling mount of the main body; and
a connecting plunger being a spring loaded plunger assembled to the first tube, being insertable into the assembling mount, and engaging the assembling hole of the assembling mount;
the handle has
a connecting plate; and
two keyholes formed through the connecting plate; and
the hoop has
a backboard having two fasteners being respectively insertable into the two keyholes;
an inserting section being insertable into the assembling mount; and
a fixing plunger being a spring loaded plunger assembled to the inserting section, being insertable into the assembling mount, and engaging with the assembling hole.

5. The wheeled vehicle as claimed in claim 4, wherein
the backboard has a board having two opposite sides;
the two fasteners are assembled to one of the two opposite sides of the board;
the hoop has a hoop body assembled to the other one of the two opposite sides of the board; and
the inserting section is connected to the board and disposed at a same side of the two opposite sides of the board with the two fasteners.

6. The wheeled vehicle as claimed in claim 5, wherein
the first tube of the pole body has multiple adjusting holes communicating with an inside of the first tube and aligned with one another; and
the pole body has
a second tube having two opposite ends, one of the two opposite ends of the second tube inserted in the first tube; and
an adjusting plunger being a spring loaded plunger assembled to the second tube, inserted in the first tube, and engaging one of the multiple adjusting holes.

7. The wheeled vehicle as claimed in claim 6, wherein the wheeled vehicle is a children's tricycle.

8. A wheeled vehicle with a ball hoop apparatus comprising:
a main body having
a first assembling mount being tubular and having an assembling hole communicating with an inside of the first assembling mount;
a front end;
a fork arranged at the front end of the main body;
a top tube; and
a second assembling mount connected to the top tube and disposed at the front end of the main body;
multiple wheels rotatably assembled to the main body; and
a pushing pole detachably assembled to the main body, having a top end, being assembleable to the first assembling mount, being assembleable to the second assembling mount, and having
a pole body being retractable and having
a first tube having two opposite ends, one of the two opposite ends of the first tube being insertable into the first assembling mount of the main body; and
a connecting plunger being a spring loaded plunger assembled to the first tube, being insertable into the first assembling mount, and engaging with the assembling hole of the assembling mount; and
a handle assembled to the pole body, disposed at the top end of the pushing pole, and having
a connecting plate; and
two keyholes formed through the connecting plate; and
a hoop detachably assembled to the main body, being assembleable to the top end of the pushing pole, being assembleable to the handle, and having
a backboard having two fasteners being respectively insertable into the two keyholes;
an inserting section being insertable into the first assembling mount; and
a fixing plunger being a spring loaded plunger assembled to the inserting section, being insertable into the first assembling mount, and engaging with the assembling hole.

9. The wheeled vehicle as claimed in claim 8, wherein
the backboard has a board having two opposite sides;
the two fasteners are assembled to one of the two opposite sides of the board;
the hoop has a hoop body assembled to the other one of the two opposite sides of the board; and
the inserting section is connected to the board and disposed at a same side of the two opposite sides of the board with the two fasteners.

10. The wheeled vehicle as claimed in claim 9, wherein
the first tube of the pole body has multiple adjusting holes communicating with an inside of the first tube and aligned with one another;
the pole body has a second tube having two opposite ends, one of the two opposite ends of the second tube inserted in the first tube; and
an adjusting plunger being a spring loaded plunger assembled to the second tube, inserted in the first tube, and engaging one of the multiple adjusting holes.

11. The wheeled vehicle as claimed in claim 10, wherein the wheeled vehicle is a children's tricycle.

* * * * *